(12) United States Patent
Müller

(10) Patent No.: US 6,694,402 B1
(45) Date of Patent: Feb. 17, 2004

(54) ACCESS CONTROL FOR A MEMORY HAVING A LIMITED ERASURE FREQUENCY

(75) Inventor: Otto Müller, Constance (DE)

(73) Assignee: Hyperstone AG, Constance (DE)

( * ) Notice: Subject to any disclaimer, the term of this patent is extended or adjusted under 35 U.S.C. 154(b) by 0 days.

(21) Appl. No.: 09/530,704
(22) PCT Filed: Dec. 31, 1998
(86) PCT No.: PCT/EP98/08516
§ 371 (c)(1),
(2), (4) Date: Jun. 14, 2000
(87) PCT Pub. No.: WO00/14641
PCT Pub. Date: Mar. 16, 2000

(30) Foreign Application Priority Data

Sep. 4, 1998 (DE) .......................... 198 40 389

(51) Int. Cl.$^7$ .......................... G06F 12/00; G11C 7/00
(52) U.S. Cl. ...................... 711/103; 365/218
(58) Field of Search ................ 711/103, 154; 365/218, 236, 185.33

(56) References Cited

U.S. PATENT DOCUMENTS

| | | | |
|---|---|---|---|
| 5,485,595 A | * | 1/1996 | Assar et al. ................. 711/103 |
| 5,606,660 A | | 2/1997 | Estakhri et al. |
| 5,673,383 A | * | 9/1997 | Sukegawa ............... 395/182.01 |
| 5,818,781 A | | 10/1998 | Estakhri et al. |
| 5,845,313 A | | 12/1998 | Estakhri et al. |
| 5,907,856 A | | 5/1999 | Estakhri et al. |
| 5,930,815 A | | 7/1999 | Estakhri et al. |
| 6,000,006 A | * | 12/1999 | Bruce et al. ................. 711/103 |
| 6,016,275 A | * | 1/2000 | Han ....................... 365/189.29 |
| 6,145,051 A | | 11/2000 | Estakhri et al. |
| 6,230,233 B1 | * | 5/2001 | Lofgren et al. ............. 711/103 |

FOREIGN PATENT DOCUMENTS

WO 95 10083 4/1995

* cited by examiner

Primary Examiner—Kimberly McLean-Mayo
(74) Attorney, Agent, or Firm—Browdy and Neimark, P.L.L.C.

(57) ABSTRACT

The present invention relates to a method for controlling the access, in a computer, of a memory having an erasure frequently limited by blocks. This memory contains utility memory blocks (NB0, NB1) which are available for a user's access by an address conversion occurring through a pointer panel (AZTO). An erasure utility category (LN0, LN1023) is maintained in the form of a table in association with each address pointer maintained in the form of a table in association with each address pointer (AP0 AP1023). This erasure utility category is increased every time a predetermined erasure-state criteria is reached. The other pointing positions of the erasure utility categories (LN0 LN1023) are further explored in the pointer panel (AZTO) until a lower erasure utility category is found. The corresponding address pointer (AP0 AP1023) is then permuted with the one located at the output with the one located at the output pointer position (AP1). The contents of the utility memory blocks corresponding to each of the address pointers are permuted. In each case, once the exploration phase is over and if no lower erasure utility category has been found, the search is interrupted.

7 Claims, 1 Drawing Sheet

ACCESS CONTROL FOR A MEMORY HAVING A LIMITED ERASURE FREQUENCY

CROSS REFERENCE TO RELATED APPLICATION

Figure 1:
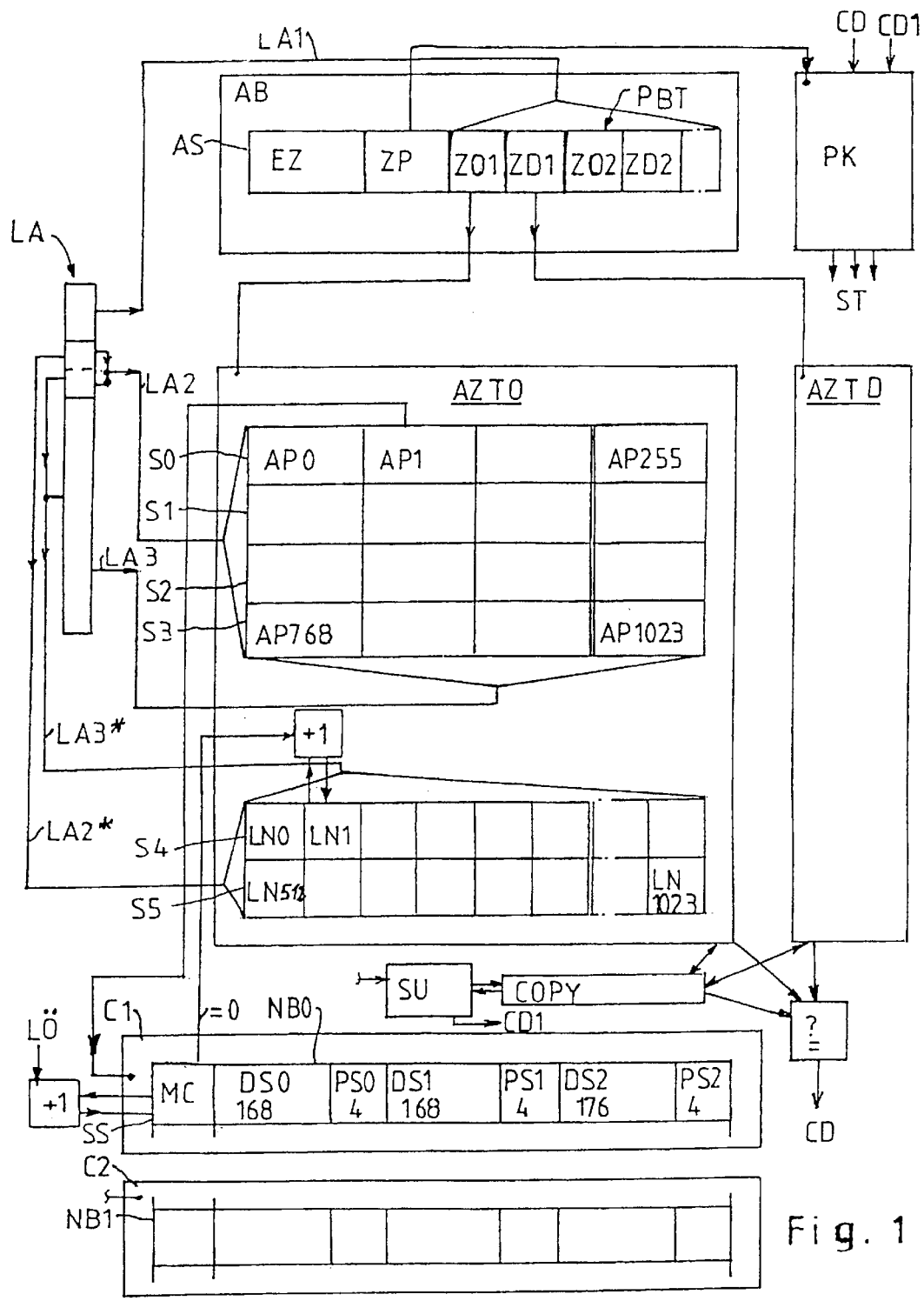

The present application is the national stage under 35 U.S.C. 371 of PCT/EP98/08516, fled Dec. 13, 1998.

The invention relates to a method for controlling the access, in a computer, for memory having a number of erases that are limited on a block basis and containing user memory blocks, which are available for a user's access, by means of an address conversion.

It is known that memory with a limited erase frequency, because of the usually significant variations in the utilization of individual memory segments and in order to provide for a better utilization of their limited number of uses, is divided into individually erasable memory blocks, which are accessed in terms of addresses by means of an address conversion in such a manner that, when the memory is first used, a number of reserve blocks are exempted from addressing, which are gradually placed into operation by means of a substitute address assignment one after another only when one of the blocks that was used until then is completely expended and has become useless. This process therefore limits the available number of blocks to begin with and leaves a large number of more or less expended, i.e., incompletely used blocks after the reserve blocks have been used up. Also, determining whether a certain address is to be replaced with another address from the reserve area becomes increasingly more complex as the number of expended blocks increases.

It is furthermore known to adjust the write time and/or the erase time to the respective aging condition of the memory.

It is the object of the invention to reveal a method whereby no blocks are kept in reserve and an almost complete, uniform utilization of the erasability of the blocks is attained.

This object is met with the address conversion taking place via a pointer table, and with an erase utilization class being maintained, assigned to each address pointer, in the form of a table and increased each time a predefined erase-state criterion is reached, after which the other erase utilization class entries are searched in the pointer table for the lowest erase utilization class with a minimum distance from the current erase utilization class, and if such an erase utilization class is found the respective address pointer and the erase utilization class are swapped with those in the initial pointer position, and the respective user memory block contents that belong to these address pointers are swapped as well.

Advantageous designs are presented in the subclaims.

Since no memory blocks that are defective at the beginning due to manufacturing defects are occupied in the address table, this novel method results in virtually all useable memory blocks being utilized close to the limit of their maximum number of erases; read-outs are possible virtually without limit; before a new content is written an erase must take place. Long before a given memory block reaches the end of its useful life it is correlated with an address that has been used less frequently in terms of erases, and an even less frequently erased block is accordingly correlated with the previously more heavily used address. In this manner there is virtually never a failure due to overuse and the reliability of the system is greatly enhanced. There are usually between 0–2% blocks that fail initially, and the permissible number of erase cycles is, for instance, 1 million. The indirect addressing is, therefore, used on one hand to exclude those blocks from being used that fail initially, and additionally to ensure a nearly complete exhaustion of the useful life capacity of the functioning blocks.

To equalize the wear of the blocks caused by the erase operations, an access program is used, which performs the wear monitoring for the individual blocks, as well as the address conversions and the management and backup of the address tables, both during boot-up of the computer as well as during each erase operation.

The respective current entry of the erase utilization class for a previously erased user memory block is made on the basis of various erase-state criteria, which can be used separately or together.

A modulo count of all erase operations of a given user memory block serves as a first erase-state criterion, for which at least one modulo counter is kept in the respective user memory block and incremented with each erase operation and used for incrementing the erase utilization class entry with each modulo pass.

The given required write time and/or erase time serves as a further erase-state criterion. It is/they are either increased each time after a subsequent verification has shown that the write or erase operation was incomplete, or determined memory-internally according to another system-dependent aging pattern.

The higher the write and/or erase time, the higher the erase utilization class entry that is made. With a memory-internal write or erase time generation, the length of time is determined in a time pulse counter, the final reading of which is then used each time as an erase-state criterion.

Furthermore, noticeable signs of wear that have resulted in a data read-out error that can be restored by redundancy are taken into consideration in such a way that an increased degradation is attached to such blocks with each occurrence of a restorable error.

The address and wear data are kept in the memory or in the memory block itself, so that the latter are correlated with the wear history during their entire life and cannot be lost or decorrelated during an exchange of memory, e.g., from one computer to another.

To be able to locate the address and wear data an anchor block is provided, which is set up in the first useable physical memory block with the first available address and can be located based on an identity number stored therein. In this anchor block a pointer to the program code is provided, and a table containing the pointers to the other block pointers or also sector pointers, if the blocks are divided into sectors, as well as to their duplicates, which are created for safety.

The block and sector address pointers are kept in designated memory blocks. These block pointers and sector pointers are stored there in the sequence of their own logical addresses in the form of a pointer table. In a different sector of the same block the corresponding erase utilization class entries are made in parallel, with the same addresses. A duplicate of the entire block serves as backup and offers the possibility to reconstruct an incomplete content, which could occur if a power outage occurs exactly during a reallocation.

The grouping of a plurality, e.g., 16, sectors of e.g., 512 bytes into a block that will be erased in its entirety keeps the memory requirement for the pointer tables within narrow limits, so that approximately 99.8% of the functioning blocks are useable.

Memory usually consists of numerous memory chips, which, in turn, contain numerous blocks. The block pointer, therefore, comprises a chip address portion and a block address portion, which are stored in combination with one another. These addresses are advantageously stored as binary numbers that are factored by element by powers of two. For example, 256 block addresses are stored consecutively in one sector of the address pointer table, and four such sectors are chained together for a total of 1024 block addresses.

The user data are advantageously divided within the blocks into sectors and within same into data strings. These sectors preferably have a length of 512 bytes plus a number of spare bytes as check bytes for error checking and error correction, as well as the modulo counter for the erase operations. Each data string can have a varying length and usually contains between 100 and 200 bytes, each with four check bytes attached, so that two to four of the strings fit into one block.

If sectors have been erased, the check syndromes, e.g., Reed Solomon Codes, are invalid. The test circuit reports a corresponding condition for further evaluation. When other sectors of this block are newly written, sectors that have been erased but are not to be provided with a new content, must not be written to; rather they must be excluded from being written to, in order to permit a later generation of correction syndromes.

The division of the memory into jointly erasable blocks of e.g., 8 K-bytes, has the advantage that the management operations are more effective than treating individual sectors of the block, and that the housekeeping memory requirement remains quite low; it is approximately 0.2%. The required block pointer comprises a chip selection component and a block address component for the respective chip internally.

During the conversion of a logical block address to a physical block address, a first logical address component is used to select the table in the anchor block, the content of which is used to select the corresponding pointer table block, and a second logical address component selects the corresponding sector of the address pointer table, and a third logical address component makes the corresponding address pointer available from the sector from which the address of the user memory block, with its chip and block number component, is taken.

At least the last used sector of the address pointer table and the anchor block are advantageously kept in the computer's housekeeping memory, so that when a consecutive addressing takes place the next address pointer from the sector can be immediately used for subsequent memory accesses, until the end of the sector has been reached.

The address pointer table blocks are advantageously subdivided into numbers of sub-units that correspond to powers of two; in this manner the individual bit groups from a logical address with an overall binary structure can be used directly for addressing. For example, four bits select the sector in the block and eight bits select the address pointer in the sector. Further bits serve for the pointer block selection via the table in the anchor block.

To equalize the wear of the individual user blocks, a modulo counter, e.g., with a size of 2 bytes, is maintained in each sector, the content of which is increased by a one after each erase operation. When a block is rewritten after an erase operation within the framework of the data exchange between blocks with different usage frequencies, the data are organized, by sector, as strings and stored with the respective generated ECC code—the redundant error correcting code—, and the modulo counter reading is noted there as well. All sectors of a block have the same modulo counter reading, which is used as redundancy for restoration purposes in case of contradictions during a later read-out. The control operation takes place every time a modulo pass is complete, i.e., when a counter content of zero occurs.

If, for example, a pass is complete at a modulo $2^{16}$ count, i.e., in the case in which the counter comprises two bytes, the erase utilization class table is called up following the address pointer table, and the erase utilization class for the block is increased by one in the corresponding table sector. The recalculated erase utilization class, which is preferably stored as a binary number in one byte, is entered into the erase utilization table. It is then checked to determine whether it has a minimum distance from the lowest class in the erase class table. If required, a swapping takes place of the address pointers and the erase utilization class for the found entry and the current entry, and a swapping of the user information of the corresponding user memory block contents, with the safety measures as described above.

In this manner the logical addresses that are used frequently are repeatedly reassigned to physical blocks that were used less frequently than the previously assigned block. This results in a balanced wear.

The process of searching for a lower or for the lowest entry can be performed quite quickly and in a simple manner since the values to be compared are preferably present in encrypted form in a single byte and stored sequentially in the sectors. The logical address of the corresponding block is then derived from the address of the location found during the search where the lower or lowest class was found.

The first search after the program start advantageously begins in the address pointer block in which the erase utilization class entry that needs to be increased at that particular time and the current address pointer are stored. The result of each search operation is stored as an index in the erase utilization class table, and the respective next search operation then starts at the subsequent index. The incrementing of the index takes place modulo the total number of existing blocks. The number of erases of the address pointer table blocks is far below the number of the maximum permissible erases, which is apparent from the product of the number of pointers in the block and the number of provided erase utilization categories, which, in terms of numbers of erases, is reached less than twice.

If a search is performed for the least worn block, a search routine is performed when the computer is turned on, during the so-called power-up, for the entry that represents the lowest wear, and this value is kept in the computer memory as a comparison value for the subsequent searches. If, during a later search, a block with such a search utility class is no longer found, the minimum wear class is increased and used for subsequent searches. In this particular case no further search takes place and the swapping of contents with another memory does not take place. Only its wear class entry has been increased.

Furthermore, bookkeeping on the quality of the user memory blocks and the strategy of the uniform utilization of same is advantageously supplemented by the fact that the detection of a read-out error in these blocks or in their sectors that was eliminated by an automatic error correction by means of the ECC syndrome or by a renewed read-out, is also used to enter the wear class in the table as an erase utilization class, with the result that a block of this type is eventually used quite seldom. All blocks are henceforth expended largely uniformly and no reserve blocks are required and the actual useability is, to a large extent, fully utilized for all blocks until the end of their useful lives.

The end of the useful life of a memory can be determined from statistical experience, as usual, however, the limit of the number of erases can also still be adjusted retroactively to the actual conditions during the operation if no signs of wear have yet been detected, particularly if read-out errors have been detected only rarely by the stored redundancy.

A particularly critical procedure is the modification of an address pointer block, as errors can occur during this process particularly if a power outage occurs during that time. Each address pointer block is, therefore, retained in memory in duplicate and both blocks are compared prior to a modification and adjusted afterwards, one after the other, to the same content.

During a power-up the originals and duplicates are compared, at which time a block that may not have been completed prior to shut-down is recognized and then updated to the same status by means of the duplicate.

If the original block has already been rewritten with a new content and the duplicate not yet erased at the moment of shut-down, one can tell the more recent status by the higher wear class entry and thus also gains an indication of the corresponding most recent address pointer entry. The duplicate must, accordingly, be renewed and the user memory block contents swapped.

FIG. 1 shows a block diagram of the memory structure and the access paths.

The first useable block in the first memory chip of the memory is the anchor block AB. It contains, in an anchor sector AS, an identity number EZ, a pointer ZP to the program code PK and a table PBT, each of which contain pairs of pointers ZO1, ZD1, ZO2, ZD2 to the original and to the duplicate of the address pointer tables AZTO, AZTD, etc.

The address pointer tables AZTO, AZTD contain sectors S0–S3, in which the address pointers AP0, AP1–AP1023 are stored consecutively.

Furthermore, in the sectors S4, S5 the erase utilization categories LN0, LN1–LN1023 are stored consecutively in a compact form in the same sequence as the address pointers AP0, AP1 . . . .

The address pointers AP0, AP1 . . . . each point to a memory chip C1, C2 and to a user memory block NB0, BN1 contained therein, with the digits of the reference symbol referring to the logical block address, which are distributed throughout the memory due to the usage history.

One of the user memory blocks NB0 is shown with its interior sector structure; there are 16 sectors, one of which is marked sector SS and filled with its structured content.

Each of the sectors SS contains three data strings DS0–DS2 with a length of 168 or 176 bytes, altogether 512 bytes, each along with one correction syndrome PS0–PS2, each of 4 bytes, and a modulo counter memory MC with 2 bytes.

The address conversion of a logical address LA with a binary structure, addresses, with a first logical address section LA1, the pointer location in the table PBT in the anchor sector AS.

The second logical address section LA2 it[1] addresses one of the sectors S0–S3, relative to the beginning of the block.

[1] Translator's note: this is a literal translation of the respective part of the German-language sentence, which is either incomplete or contains an extraneous "it".

The third logical address section LS3 indicates the position of one of the address pointers AP0–AP1023 within the selected sector.

For the case of a selection of the corresponding erase utilization class entry, the divisions of the second and third logical address section are somewhat different in that the second section LA2* and the third section LA3* are shorter or longer, respectively, by one bit.

A reverse conversion of the address pointer position or the position of the utilization class entry in the table AZT0 can be performed in the reverse direction, as is readily apparent.

The data transfer connections and the functional connections for the selection processes are symbolic in principle and only in part actually to be implemented on the respective chip or on the memory board, e.g., for the chip selection, the block selection and the sector selection. Also the +1 adder, which increases the content of the modulo counter MC using the erase signal Lö, and the path of the modulo pass signal (=0) for the increase (+1) of the erase utilization class entry in the counter LN1, which is selected directly in parallel with the address pointer AP1, are to be understood only as illustrative and functional.

Also the copy COPY, which is stored in the computer memory and, like the original of the address pointer table AZTO and the duplicate AZTD each are compared with a search operation SU in a comparator (?=) are symbolized in abstract form. The search operation SU and the comparisons (?=) generate operating signals CD, CD1, which are processed with the program component PK and generate corresponding control signals.

What is claimed is:

1. A method for controlling access of a memory having a number of erases that is limited on a block basis, the memory containing user memory blocks (NB0, NB1), which are available for user data bytes (DS0,–DS2), in a computer, by means of an address conversion using a pointer table (AZTO) containing address pointers (AP0,–AP1023) to the memory blocks, each associated with a counter, which is increased each time a predefined erase-state criterion for the associated memory block is reached, characterized in that the pointer table (AZTO) is held in a memory block, each counter representing an erase utilization class (LN0,–LN1023) to the associated memory block, after each reach of an erase-state criterion of a specific memory block with an initial pointer position (AP1), the erase utilization classes (LN0,–LN1023) of other memory blocks are searched in the pointer table (AZTO) for a lowest value with a minimum distance to the erase utilization class of the associated memory block and when such an erase utilization class is found, the associated address pointer and erase utilization class are swapped with corresponding address pointer and utilization class in the initial pointer position (AP1) and the contents of the memory blocks associated to those two address pointers are swapped as well, and after each write and/or erase operation of a user memory block (NR0,–NR1), the completeness of the operation is checked and, if required, the given process is repeated with an accordingly longer write time or erase time, which is then rated as the erase-state criterion.

2. A method for controlling access of a memory having a number of erases that is limited on a block basis, the memory containing user memory blocks (NB0, NB1), which are available for user data bytes (DS0,–DS2), in a computer, by means of an address conversion using a pointer table (AZTO) containing address pointers (AP0,–AP1023) to the memory blocks, each associated with a counter, which is increased each time a predefined erase-state criterion for the associated memory block is reached, characterized in that the pointer table (AZTO) is held in a memory block, each counter representing an erase utilization class (LN0,–LN1023) to the associated memory block, after each reach of an erase-state criterion of a specific memory block with an initial pointer position (AP1), the erase utilization classes (LN0,–LN1023) of other memory blocks are searched in the pointer table (AZTO) for a lowest value with a minimum distance to the erase utilization class of the associated memory block and when such an erase utilization class is found, the associated address pointer and erase utilization class are swapped with corresponding address pointer and utilization class in the initial pointer position (AP1) and the contents of the memory blocks associated to those two address pointers are swapped as well, in each user memory block (NB0,–BN1) user data bytes (DS0,–DS2) and check bytes (PS0,–PS2) are stored for a read-out error correction, and each time an error that can be reconstructed with the check bytes (PS0,–PS2) is detected during a read-out of a user memory block (BN0,–BN1) this is rated as an erase-state criterion and the erase utilization class entry (LN0,–LN1023) maintained in table-form that belongs to the respective user memory block (BN0,–BN1) is accordingly increased by a predefined number of classes.

3. A method for controlling access of a memory having a number of erases that is limited on a block basis, the memory containing user memory blocks (NB0, NB1), which are available for user data bytes (DS0,–DS2), in a computer, by means of an address conversion using a pointer table (AZTO) containing address pointers (AP0,–AP1023) to the memory blocks, each associated with a counter, which is increased each time a predefined erase-state criterion for the associated memory block is reached, characterized in that the pointer table (AZTO) is held in a memory block, each counter representing an erase utilization class (LN0,–LN1023) to the associated memory block, after each reach of an erase-state criterion of a specific memory block with an initial pointer position (AP1), the erase utilization classes (LN0,–LN1023) of other memory blocks are searched in the pointer table (AZTO) for a lowest value with a minimum distance to the erase utilization class of the associated memory block and when such an erase utilization class is found, the associated address pointer and erase utilization class are swapped with corresponding address pointer and utilization class in the initial pointer position (AP1) and the contents of the memory blocks associated to those two address pointers are swapped as well, and each user memory block (NB0, NB1) is divided into a plurality of sectors (SS) and the pointer table (AP0,–AP1023) is divided into blocks and sectors, and a modulo erase counter (MC) is assigned to each sector (SS) of a user memory block (NB0, NB1) to keep count quasi in parallel with all sectors belonging to a block, and their quasi-parallel operation is checked from time to time and reconstructed according to the redundancy content of the other counters (MC) whenever the content of a counter is found to deviate.

4. A method for controlling access of a memory having a number of erases that is limited on a block basis, the memory containing user memory blocks (NB0, NB1), which are available for user data bytes (DS0,–DS2), in a computer, by means of an address conversion using a pointer table (AZTO) containing address pointers (AP0,–AP1023) to the memory blocks, each associated with a counter, which is increased each time a predefined erase-state criterion for the associated memory block is reached, characterized in that the pointer table (AZTO) is held in a memory block, each counter representing an erase utilization class (LN0,–LN1023) to the associated memory block, after each reach of an erase-state criterion of a specific memory block with an initial pointer position (AP1), the erase utilization classes (LN0,–LN1023) of other memory blocks are searched in the pointer table (AZTO) for a lowest value with a minimum distance to the erase utilization class of the associated memory block and when such an erase utilization class is found, the associated address pointer and erase utilization class are swapped with corresponding address pointer and utilization class in the initial pointer position (AP1) and the contents of the memory blocks associated to those two address pointers are swapped as well, and the first search of the erase utilization class entries (LN0,–LN1023) in the pointer table (AZTO, COPY) after the start-up starts in the memory block in which the current address pointer (AP0,–AP1023) is kept, and that the result of each search operation is stored as an index in the erase utilization class table.

5. The method according to claim 4, characterized in that the subsequent searches in the erase utilization class table each start at the modulo next index and the incrementing of the index takes place modulo the total number of existing blocks.

6. A method for controlling access of a memory having a number of erases that is limited on a block basis, the memory containing user memory blocks (NB0, NB1), which are available for user data bytes (DS0,–DS2), in a computer, by means of an address conversion using a pointer table (AZTO) containing address pointers (AP0,–AP1023) to the memory blocks, each associated with a counter, which is increased each time a predefined erase-state criterion for the associated memory block is reached, characterized in that the pointer table (AZTO) is held in a memory block, each counter representing an erase utilization class (LN0,–LN1023) to the associated memory block, after each reach of an erase-state criterion of a specific memory block with an initial pointer position (AP1), the erase utilization classes (LN0,–LN1023) of other memory blocks are searched in the pointer table (AZTO) for a lowest value with a minimum distance to the erase utilization class of the associated memory block and when such an erase utilization class is found, the associated address pointer and erase utilization class are swapped with corresponding address pointer and utilization class in the initial pointer position (AP1) and the contents of the memory blocks associated to those two address pointers are swapped as well, and in the first administrative memory block, an anchor block (AB) is set up, into which an identity number (EZ) is written for which a search is performed during each power-up, and a pointer (ZP) to a program (PK) for performing this process is stored, and a table (PBT), the contents of which indicate the location of the original pointer table (ZO1, ZO2) and the pointer table duplicates (ZD1, ZD2), is stored.

7. The method according to claim 6, characterized in that the table (PBT) is copied from the anchor block (AB) into the internal computer memory and maintained there in parallel.

* * * * *